United States Patent
Asakura et al.

(10) Patent No.: US 6,184,471 B1
(45) Date of Patent: Feb. 6, 2001

(54) CONNECTING STRUCTURE AND METHOD FOR A SHIELDED CABLE

(75) Inventors: Nobuyuki Asakura; Yasumichi Kuwayama; Tetsuro Ide, all of Shizuoka-ken (JP)

(73) Assignee: Yazaki Corporation, Tokyo (JP)

( * ) Notice: Under 35 U.S.C. 154(b), the term of this patent shall be extended for 0 days.

(21) Appl. No.: 09/165,286

(22) Filed: Oct. 2, 1998

(30) Foreign Application Priority Data

Oct. 3, 1997 (JP) .................................................. 9-271560
Apr. 24, 1998 (JP) ................................................ 10-115620

(51) Int. Cl.$^7$ .................................................. H01R 13/648
(52) U.S. Cl. .............................................. 174/78; 439/98
(58) Field of Search .................... 174/78, 74 R, 174/75 R, 75 C; 439/98, 99

(56) References Cited

U.S. PATENT DOCUMENTS

| | | | |
|---|---|---|---|
| 3,643,008 | * 2/1972 | Brazee | 174/78 X |
| 3,683,105 | * 8/1972 | Shamash et al. | 174/68.5 |
| 4,590,950 | * 5/1986 | Iwaszkiewicz et al. | 174/75 R X |
| 5,136,122 | * 8/1992 | Kwitkowski et al. | 174/94 R |
| 5,163,856 | 11/1992 | McGaffigan et al. | 439/874 |
| 5,267,878 | * 12/1993 | Shinji et al. | 439/98 X |
| 5,315,063 | * 5/1994 | Auclair | 174/78 |
| 5,569,886 | * 10/1996 | Tanabe et al. | 174/260 |
| 5,584,122 | 12/1996 | Kato et al. | 29/872 |
| 5,722,841 | * 3/1998 | Wright | 439/98 |
| 5,868,584 | * 2/1999 | Cook et al. | 439/98 |

FOREIGN PATENT DOCUMENTS

| | | |
|---|---|---|
| 2/211/367 | 6/1989 | (GB) . |
| 2 328 806 | 8/1998 | (GB) . |
| 7-201383 | 8/1995 | (JP) . |
| 8-78071 | 3/1996 | (JP) . |

OTHER PUBLICATIONS

European Search Report dated Nov. 23, 1998.

\* cited by examiner

*Primary Examiner*—Kristine Kincaid
*Assistant Examiner*—Chau N. Nguyen
(74) *Attorney, Agent, or Firm*—Finnegan, Henderson, Farabow, Garrett & Dunner, L.L.P.

(57) ABSTRACT

A shielded cable includes core wires, an inner insulating cover for covering the core wires, a braided wire on an outer periphery of the inner insulating cover, and an outer insulating cover on an outer periphery of the braided wire. A shielded terminal has an insertion connecting portion coated with low-melting point joining material. The insertion connecting portion of the shielded terminal is inserted into the inside of the shielded cable from outside of the outer insulating cover such that the low-melting point joining material opposes the braided wire. With this condition, the shielded cable is subjected to ultrasonic vibration through a plurality of small protrusions of an ultrasonic horn over the outer insulating cover. As a result, the low-melting point joining material is melted so as to conductively connect the insertion connecting portion and braided wire to each other.

18 Claims, 12 Drawing Sheets

CONNECTING STRUCTURE AND METHOD FOR A SHIELDED CABLE

BACKGROUND OF THE INVENTION

This invention relates to a connecting structure and method for a shielded cable.

The shielded cable comprises conductive core wires, an inner insulating cover for covering an outer periphery of the core wires, a braided wire on an outer periphery of the inner insulating cover and an outer insulating cover for covering an outer periphery of the inner insulating cover over the braided wire. According to a conventional connecting structure of the shielded cable, the shielded cable is separated to the core wires and braided wire at an end portion thereof, then, an end of the braided wire is bound with a heat shrinkage tube and the ends of the core wires and braided wire are crimped with a terminal metal (Japanese Patent Application Laid-Open Publication No. 201383).

However, the aforementioned conventional structure requires a step for peeling the outer insulating cover to expose the braided wire, for peeling the inner insulating cover to expose the core wires, for twisting the exposed braided wire and for inserting the twisted braided wire into a heat shrinkage tube. Therefore, the connecting procedure is complicated.

Further, because there exists no braided wire on a long distance of the inner insulating cover, there is a possibility that the shielding performance may drop.

Therefore, an object of the present invention is to provide a connecting structure having a simple structure, capable of keeping an excellent shielding performance, not requiring a troublesome cover peeling procedure, and enabling to carry out a connecting work rapidly and easily, and a method therefor.

SUMMARY OF THE INVENTION

To achieve the above object, according to a first aspect of the present invention, there is provided a connecting structure for connecting a shielded cable and a terminal, comprising: a shielded cable having conductive core wire, an inner insulating portion for covering the core wire, a braided wire on an outer periphery of the inner insulating portion, and an outer insulating portion over the braided wire for covering the outer periphery of the inner insulating portion; and a terminal containing a connecting portion coated with melt-joining material, the melt-joining material facing the braided wire with the connecting portion being inserted in the shielded cable, and the shielded cable subjected to ultrasonic vibration through small protrusions of an ultrasonic horn on the outer insulating portion, whereby the melt-joining material is melted so as to conductively connect the braided wire and the connecting portion with each other.

The aforementioned melt-joining material may be solder.

The connecting portion of the terminal has only to be inserted into the shielded cable such that it opposes the braided wire. Concretely, the connecting portion may be inserted in between the outer insulating portion and braided wire or between the braided wire and inner insulating portion.

An ultrasonic horn for use in the connecting structure of the present invention has a plurality of small protrusions on an end portion thereof. Each of the small protrusions comes into contact with an outer periphery of the outer insulating cover. If the ultrasonic horn vibrates ultrasonically, each small protrusion transmits ultrasonic vibration to the shielded cable. By this transmission, the melt-joining material is melted so that the braided wire of the shielded cable and connecting portion of the terminal are conductively connected with each other.

In the above described structure, the braided wire and terminal are not mechanically in contact with each other, but metallically connected with each other by melting and joining of the melt-joining material. Thus, a high reliability is obtained in terms of electrical connection.

A cover peeling procedure for exposing the braided wire is not required. Thus, the braided wire and terminal can be connected with each other easily thereby reducing the number of steps of the procedure.

Because the braided wire covers almost all area of the inner insulating cover, the shielding performance is maintained in an excellent condition.

All surface of an end portion of the ultrasonic horn is not in contact with the shielded cable, but only the small protrusions are in contact therewith, so that ultrasonic energy is applied to the shielded cable through the small protrusions in contact. Thus, ultrasonic energy acts concentratedly. As a result, energy loss is extinguished and the joining material is melted sufficiently even in a short time or with a small output. Consequently, the outer insulating portion can be prevented from being damaged by ultrasonic vibration.

The ultrasonic energy is applied to the shielded cable through each of the plural small protrusions. Therefore, as compared to a case in which an ultrasonic horn having a flat shaped end portion is used, ultrasonic energy is applied equally in a predetermined range. That is, ultrasonic energy is applied equally to all surface of the connecting portion of the terminal. Thus, there never an event in which the joining material coated on the connecting portion is dispersed in uneven directions. As a result, the braided wire and connecting portion are evenly joined with each other at a contact portion therebetween thereby a reliable connecting strength being obtained.

According to a second aspect of the present invention, there is provided a connecting structure according to the first aspect, wherein the connecting portion of the terminal is inserted between the braided wire and the inner insulating portion.

According to the above structure, as compared to a case in which the connecting portion is inserted in between the outer insulating portion and braided wire, it is inserted deeply in the diameter direction of the shielded cable. Therefore, the terminal and shielded cable are firmly connected with each other and even if a pulling force is applied to the terminal, the terminal never slips out, so that a stable connection is maintained.

According to a third aspect of the present invention, there is provided a connecting structure according to the first aspect, wherein the terminal includes a sheet-like terminal main body, the connecting portion on one side of the terminal main body, and a grounding terminal portion on the other side of the terminal main body, and the melt-joining material is coated on a surface of the connecting portion.

In the above structure, the terminal main body comprises only the connecting portion and grounding terminal portion. The connecting portion is inserted into the shielded cable so that the terminal is connected. Therefore, the terminal does not have to be formed in a complicated shape for engaging with or joining with the shielded cable. Thus, the terminal has a simple structure, so that production and handling thereof are easy.

According to a fourth aspect of the present invention, there is provided a connecting method for connecting a shielded cable and a terminal, the shielded cable comprising conductive core wire, an inner insulating portion for covering the core wire, a braided wire on an outer periphery of the inner insulating portion, and an outer insulating portion over the braided wire for covering the outer periphery of the inner insulating portion, and the terminal containing a connecting portion coated with melt-joining material, the method comprising the steps of:

inserting the connecting portion into the shielded cable, the melt-joining material facing the braided wire, while a slit is formed on the outer insulating portion and the connecting portion is inserted into the shielded cable through the slit; and applying ultrasonic vibration to the shielded cable through small protrusions of an ultrasonic horn in contact with the outer insulating portion, the melt-joining material being melted so as to conductively connect the braided wire and the connecting portion with each other.

Because the connecting portion of the shielded terminal is inserted through the slit formed on the outer insulating portion of the shielded cable, the work for inserting the connecting portion is easy. Further, because the slit can be formed by incision, it can be formed easily.

According to a fifth aspect of the present invention, there is provided a connecting method according to the fourth aspect, wherein the slit reaches the inner insulating portion through the outer insulating portion and the braided wire.

The slit is formed so as to penetrate through the outer insulating cover and braided wire, so that the connecting portion is inserted in between the inner insulating portion and braided wire. Therefore, the connecting portion is inserted deeply into the shielded cable so that the terminal and shielded cable are firmly connected with each other.

According to a sixth aspect of the present invention, there is provided an ultrasonic horn for use in connecting a shielded cable and a terminal; the shielded cable comprising conductive core wire, an inner insulating portion for covering the core wire, a braided wire on an outer periphery of the inner insulating portion, and an outer insulating portion over the braided wire for covering the outer periphery of the inner insulating portion; the terminal containing a connecting portion coated with melt-joining material; the melt-joining material facing the braided wire with the connecting portion being inserted in the shielded cable; the ultrasonic horn comprising: an end portion coming into contact with the outer insulating portion; and a plurality of small protrusions formed on the end portion, the shielded cable subjected to ultrasonic vibration through small protrusions of an ultrasonic horn on the outer insulating portion, whereby the melt-joining material is melted so as to conductively connect the braided wire and the connecting portion with each other.

The plurality of the small protrusions of the ultrasonic horn are in contact with the outer insulating portion of the shielded cable so as to apply ultrasonic vibration. Therefore, ultrasonic energy can be applied concentrately, so that the energy loss is extinguished and effective joining can be carried out in a short time and with a small output. Therefore, wearing of the ultrasonic horn is reduced to extend the service life thereof.

Because each of the plural small protrusions vibrates ultrasonically, ultrasonic energy is not applied unevenly. Thus, the joining material coated on the connecting portion of the terminal is never dispersed in uneven directions. Therefore, the braided wire and connecting portion are connected with each other evenly through a predetermined wide range, so that the reliability of the connecting strength is intensified.

According to a seventh aspect of the present invention, there is provided an ultrasonic horn according to the sixth aspect, wherein the small protrusions are spaced together along the length of the shielded cable.

In the above structure, an operation of the sixth aspect is exerted in a wide range along the length of the shielded cable. Thus, the shielded cable and terminal can be connected firmly with each other along the length of the shielded cable.

According to an eighth aspect of the present invention, there is provided s connecting structure for connecting a shielded cable and a grounding cable, comprising: a shielded cable having conductive core wire, an inner insulating portion for covering the core wire, a braided wire on an outer periphery of the inner insulating portion, and an outer insulating portion over the braided wire for covering the outer periphery of the inner insulating portion; and a grounding cable having a cable main body, a grounding terminal connected to one end of the cable main body, and a sheet-like connecting piece connected to the other end of the cable main body, the connecting piece being coated with melt-joining material; the melt-joining material facing the braided wire with the connecting piece being inserted in the shielded cable; and the shielded cable subjected to ultrasonic vibration through small protrusions of an ultrasonic horn on the outer insulating portion, whereby the melt-joining material is melted so as to conductively connect the braided wire and the connecting piece with each other.

In the above structure, by inserting the connecting portion of the grounding wire into the shielded cable and applying ultrasonic vibration through the small protrusions of the ultrasonic horn, the joining material is melted so that the connecting piece and braided wire are conductively connected with each other so as to connect the braided wire and grounding cable. Because the cable main body of the grounding cable is so flexible that it can be curved or bent freely, the grounding terminal can be disposed freely depending on a grounding object. Thus, the freedom of wiring is increased.

According to a ninth aspect of the present invention, there is provided a connecting structure according to the eighth aspect, wherein the cable main body has a plurality of conductive core wires, and the connecting piece is constituted of core wires of the cable main body formed in a tab shape by thermo compression bonding.

In the above structure, by compression-bonding the core wires in the cable main body thermally by ultrasonic welding or resistance welding, the sheet-like shield connecting piece in which the core wires are bonded with each other is formed. Therefore, the grounding cable can be obtained only by a simple processing on an ordinary covered wire.

According to a tenth aspect of the present invention, there is provided a connecting structure according to the eighth aspect, wherein the connecting piece is constituted of a sheet-like conductive member conductively connected to the cable main body.

In the above structure, only by connecting a conductive member to an ordinary covered wire by crimping or soldering, the grounding cable can be obtained easily.

According to an eleventh aspect of the present invention, there is provided a connecting method for connecting a shielded cable and a grounding cable, the shielded cable having conductive core wire, an inner insulating portion for covering the core wire, a braided wire on an outer periphery of the inner insulating portion, and an outer insulating portion over the braided wire for covering the outer periphery of the inner insulating portion; the method comprising the-steps of:

connecting a grounding terminal to an end of a cable main body of the grounding cable;

providing a connecting piece on the other end of the cable main body;

coating the connecting piece with melt-joining material;

inserting the connecting piece into the shielded cable, the melt-joining material facing the braided wire; and applying ultrasonic vibration to the shielded cable through a plurality of small protrusions of an ultrasonic horn in contact with the outer insulating portion, the melt-joining material melted so as to conductively connect the braided wire and the connecting piece with each other.

In the above method, by connecting the grounding terminal on an end of the cable main body and providing the connecting piece on the other end thereof, the grounding cable is produced. Then, by inserting the connecting piece of the grounding cable into the shielded cable and applying ultrasonic vibration through the small protrusions of the ultrasonic horn so as to melt the joining material, the braided wire and grounding cable are connected with each other through the connecting piece. Because the connecting piece is a sheet, it can be inserted into the shielded cable easily so that the grounding cable and shielded cable are connected with each other easily.

According to a twelfth aspect of the present invention, there is provided a connecting method according to the eleventh aspect, wherein the cable main body has a plurality of conductive core wires, and the connecting piece is constituted of core wires of the cable main body formed in a tab shape by thermo compression bonding.

In the above method, the connecting piece is formed by thermo compression bonding of the core wires in the cable main body. Thus, the connecting piece can be formed in such a simple processing.

According to a thirteenth aspect of the present invention, there is provided a connecting method according to the eleventh aspect, wherein the connecting piece is constituted of a sheet-like conductive member conductively connected to the cable main body.

In the above method, only by connecting the sheet-like conductive member to the core wires of the cable main body, the connecting piece can be provided on the grounding cable.

According to a fourteenth aspect of the present invention, there is provided a grounding cable to be connected to a shielded cable; the shielded cable having conductive core wire, an inner insulating portion for covering the core wire, a braided wire on an outer periphery of the inner insulating portion, and an outer insulating portion over the braided wire for covering the outer periphery of the inner insulating portion; the grounding wire comprising: a cable main body having an insulating cover and conductive core wires covered with the insulating cover; a grounding terminal connected to the core wires at one end of the cable main body; and a connecting piece constituted of the core wires at the other end of the cable main body formed in a tab shape by thermo compression bonding, the connecting piece being coated with melt-joining material.

Because the aforementioned grounding cable has the connecting piece which is inserted into the shielded cable and connected to the braided wire, it can be used for connection to the shielded cable. Further, because the grounding cable has a flexibility, the freedom of wiring is increased.

According to a fifteenth aspect of the present invention, there is provided a grounding cable to be connected to a shielded cable; the shielded cable having conductive core wire, an inner insulating portion for covering the core wires, a braided wire on an outer periphery of the inner insulating portion, and an outer insulating portion over the braided wire for covering the outer periphery of the inner insulating portion: the grounding wire comprising: a cable main body having an insulating cover and conductive core wires covered with the insulating cover; a grounding terminal connected to the core wires at one end of the cable main body; and a sheet-like connecting piece conductively connected to the cable main body, the connecting piece being coated with melt-joining material.

Because the aforementioned grounding cable has the sheet-like conductive member which is inserted into the shielded cable and connected to the braided wire, as the connecting piece, it can be used for connection to the shielded cable. Further, because the grounding cable has a flexibility, the freedom of wiring is increased.

DESCRIPTION OF THE PREFERRED EMBODIMENTS

Figure 1:
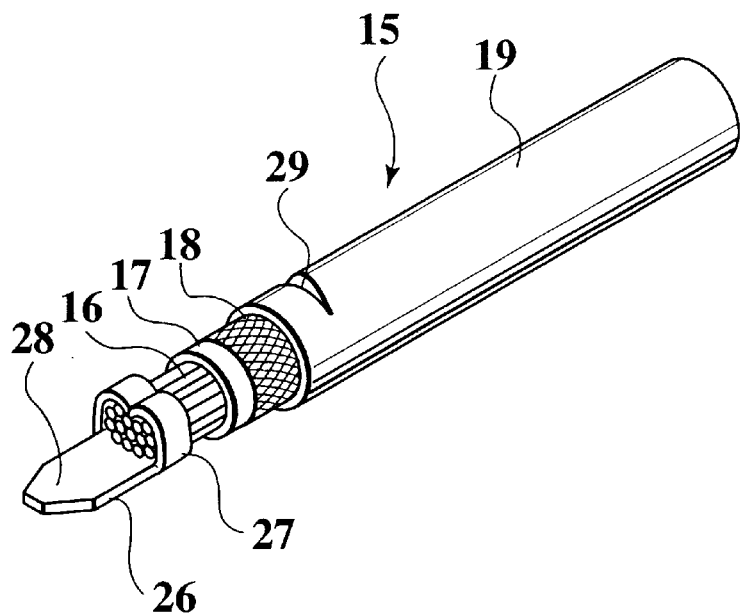
FIG. 1 is a perspective view of a shielded cable before connection according to a first embodiment of the present invention.

Hereinafter, the embodiment of the present invention will be described with reference to the accompanying drawings.
First Embodiment FIGS. 1–7 show a first embodiment of the present invention. As shown in FIGS. 1, 7, the shielded cable 15 has a coaxial structure comprising a plurality of core wires 16, an inner insulating cover 17, a braided wire 18, and an outer insulating cover 19 made of resin. Each of the core wires 16 is composed of a conductor. The inner insulating cover 17 covers the core wires 16. The braided wire 18 is provided around the inner insulating cover 17. The outer insulating cover 19 is provided around the braided wire 18 and covers the core wires 16, inner insulating cover 17 and braided wire 18.

According to this embodiment, an end of a shielded terminal 21 coated with conductive low-melting point joining material (melt joining material) 20 is inserted into an inside of the shielded cable 15, ultrasonic vibration is applied to the outer insulating cover 19 so as to melt the low-melting point joining material 20 and finally the end of the shielded terminal 21 is conductively connected to the braided wire 18 of the shielded cable 15.

Figure 2A:
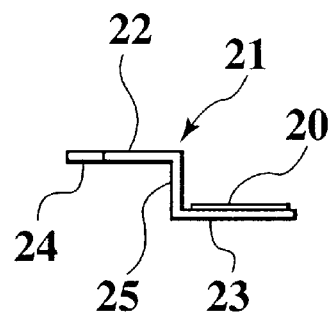
FIG. 2A is a side view of a shielded terminal for use in the first embodiment.
Figure 2B:
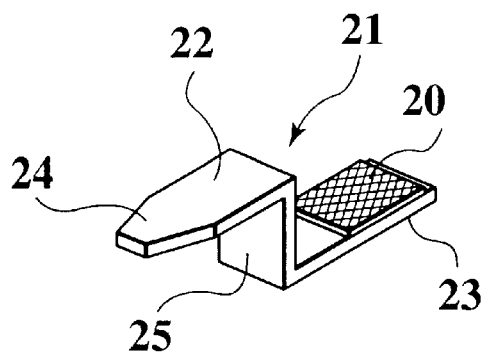
FIG. 2B is a perspective view of a shielded terminal for use in the first embodiment.
Figure 3:
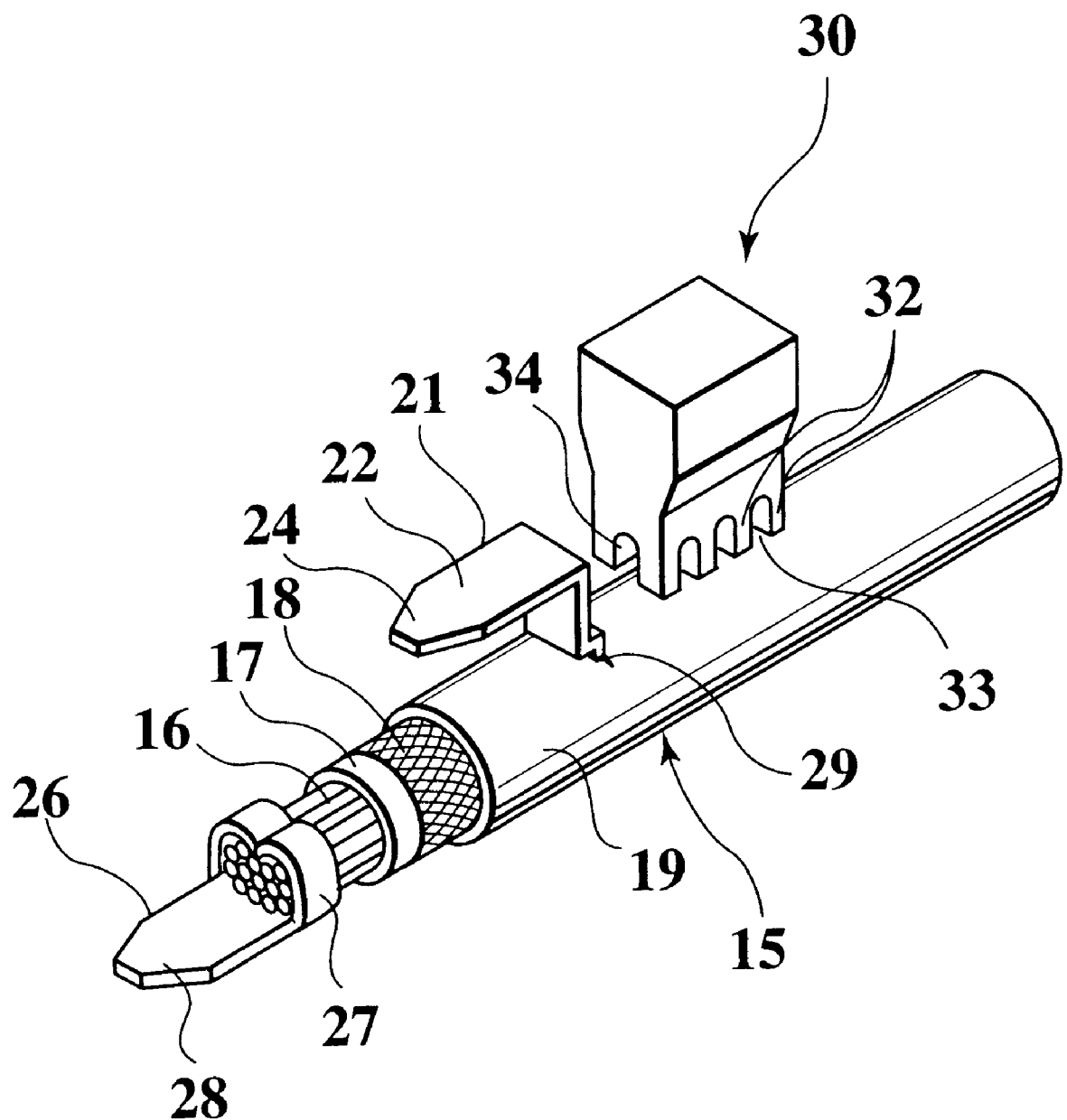
FIG. 3 is a perspective view showing a condition in which ultrasonic vibration is applied according to the first embodiment.

As shown in FIG. 2A, the shielded terminal 21 has a configuration of being entirely bent in the shape of Z, comprising a terminal main body 22, an insertion connecting portion (connecting portion) 23 provided on an side of the terminal main body 22, and a grounding terminal portion 24 provided on the other side of the terminal main body 22.

The insertion connecting portion 23 is inserted into the inside of the shielded cables. The insertion connecting portion 23 extends along the length of the shielded cable 15.

The aforementioned low-melting point joining material is applied to a top surface of the insertion connecting portion 23. As the low-melting point joining material 20, a solder having a low melting point or the like is used and fixed to the insertion connecting portion 23 by plating or the like.

The low-melting point joining material 20 is provided on the insertion connecting portion 23 such that it faces the braided wire 18 of the shielded cable 15. In this embodiment, as described later, the insertion connecting portion 23 is inserted in between the braided wire 18 of the shielded cable 15 and inner insulating cover 17 located inside thereof. Thus, the low-melting point joining material 20 is provided on the top surface (top surface when the shielded terminal is placed as shown in FIG. 2A) of the insertion connecting portion 23 which faces the braided wire 18.

Before connection, the shielded cable 15 is uncovered, so that the core wires 16 are exposed from an end thereof. A terminal metal 26 is fit to the ends of the exposed core wires 16 as shown in FIG. 1. The terminal metal 26 comprises a crimping portion 27 and a contact portion 28. The crimping portion 27 is crimped so as to connect to the core wires 16 of the shielded cable 15. The contact portion 28 extends from the crimping portion 27 such that it is far from the core wires 16 in the length direction and is coupled with a mating terminal.

Next, a connecting method of this embodiment will be described. As shown in FIG. 1, a slit 29 is formed in the shielded cable 15. The slit 29 is formed at a position which is near an end portion of the shielded cable 15 and apart from the end portion, and along the circumference perpendicular to the lengthwise direction of the shielded cable 15. The slit 29 is formed so as to go through the outer insulating cover 19 and braided wire 18 and reach the inner insulating cover 17.

By inserting the insertion connecting portion 23 of the shielded terminal 21 into the slit 29, the insertion connecting portion 23 is introduced into the inside of the shielded cable 15. Insertion of the insertion connecting portion 23 is carried out along the inner insulating cover 17, so that the insertion connecting portion 23 is inserted in between the inner insulating cover 17 and braided wire 18. By such an insertion, as shown in FIG. 6, the low-melting point joining material 20 faces the braided wire 18 from down.

Figure 6:
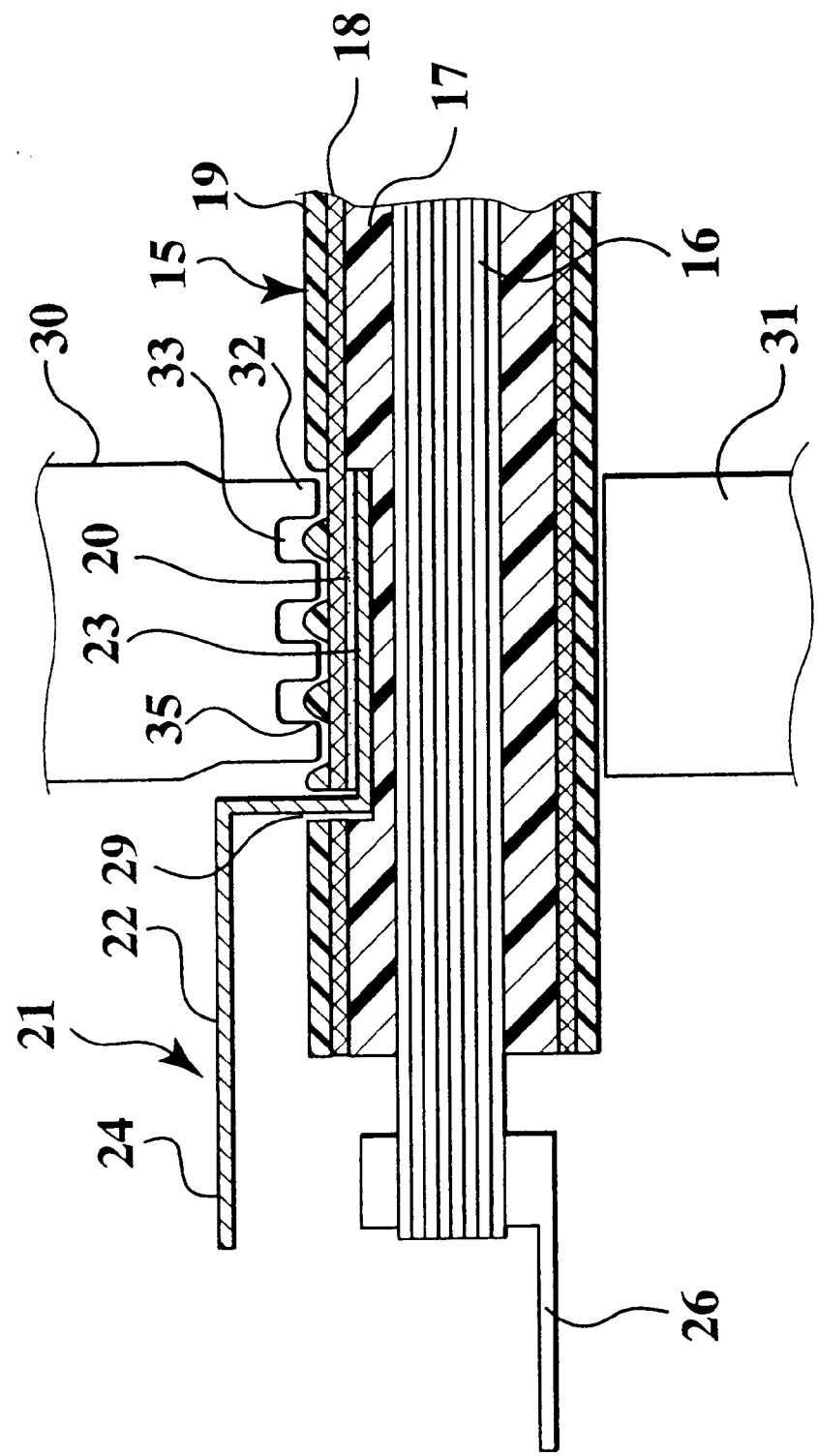
FIG. 6 is a sectional view showing a condition in which ultrasonic vibration is applied to the shielded cable and shielded terminal according to the first embodiment.
Figure 7:
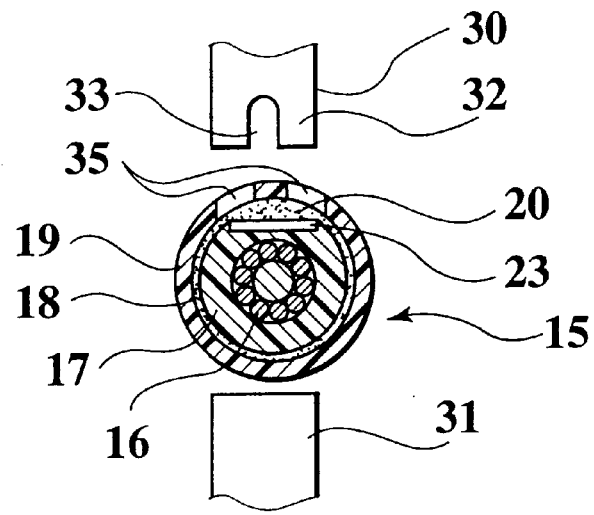
FIG. 7 is a sectional view taken along the line VII—VII of FIG. 5, showing an application of ultrasonic vibration according to the first embodiment.

After the insertion connecting portion 23 is inserted, as shown in FIG. 6, the outer insulating cover 19 of the shielded cable 15 is nipped between the ultrasonic horn 30 and anvil 31 and the ultrasonic horn 30 is ultrasonically vibrated with a pressure. Then, the low-melting point joining material 20 is melted by a generation of heat inside by ultrasonic energy of the ultrasonic vibration. Then, the braided wire 18 and insertion connecting portion 23 are metallically connected with each other by the melted low-melting point joining material 20. At this time, the melted low-melting point joining material 20 invades into meshes of the braided wire 18 so that the braided wire 18 and insertion connecting portion 23 are firmly connected with reach other.

Figure 4:
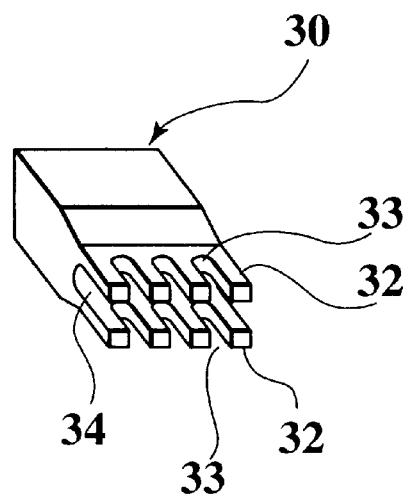
FIG. 4 is a perspective view of an ultrasonic horn for use in the first embodiment.

As shown in FIG. 4, the ultrasonic horn 30 contains a plurality of small protrusions 32 formed on an end portion in contact with the outer insulating cover 19. The plurality of the small protrusions 32 are divided to two rows along the length of the shielded cable 15 and four protrusions protrude with a gap portion 33 between the adjacent ones. That is, the small protrusions 32 of each row are formed alternately with the gap portions 33 along the length of the shielded cable 15.

A dent portion 34 is provided between the rows of the divided small protrusions 32 such that it is surrounded by the small protrusions 32. The dent portion 34 and gap portion 33 are not in contact with the outer insulating cover 19, so that ultrasonic vibration is not applied in this portion.

In the ultrasonic horn 30 having the above described structure, ultrasonic vibration is applied from the plurality of the small protrusions 32 in contact with the outer insulating cover 19 And no ultrasonic vibration is transmitted from the gap portion 33 and dent portion 34. Therefore, ultrasonic vibration is dispatched not from an entire area of the end portion of the ultrasonic horn but from a small area of each small protrusion 32. Thus, ultrasonic energy can be concentrated on a spot. As a result, the low-melting point joining material can be melted and connected even in a short time or with a small output, thereby making it possible to carry out effective ultrasonic vibration without energy loss. In such an effective ultrasonic vibration, there never occurs such a damage that the outer insulating cover 19 is broken or torn, thereby preventing an event in which the braided wire 18 may be exposed unexpectedly so as to deteriorate the appearance.

Further, because ultrasonic vibration is applied from the plurality of the small protrusions 32 and no ultrasonic vibration is dispatched from the gap portions between the small protrusions 32 and dent portion 34, ultrasonic vibration is not applied unevenly as compared to a case of using an ultrasonic horn having a flat end portion. Thus, there never occurs a case in which the low-melting point joining material 20 is dispersed in uneven directions such as a width direction of the insertion connecting portion 23, so that the melted low-melting joining material 20 is scattered evenly on an entire surface of the insertion connecting portion 23 and braided wire 18. As a result, a reliable connection can be achieved.

Particularly because the dent portion 34 is provided between the two rows of the small protrusions 32 and the two rows of the small protrusions 32 located outside of the dent portion 34 vibrate ultrasonically according to this embodiment, the low-melting joining material 20 is not dispersed outside of the insertion connecting portion 23 so that the low-melting point joining material 20 can be effectively used for the connection.

Further, because each row of the small protrusions 32 is provided along the length of the shielded cable 15, the above described operation is carried out along the length of the shielded cable 15. Consequently, the shielded terminal 21 can be firmly connected along the length of the shielded cable 15.

Figure 5:
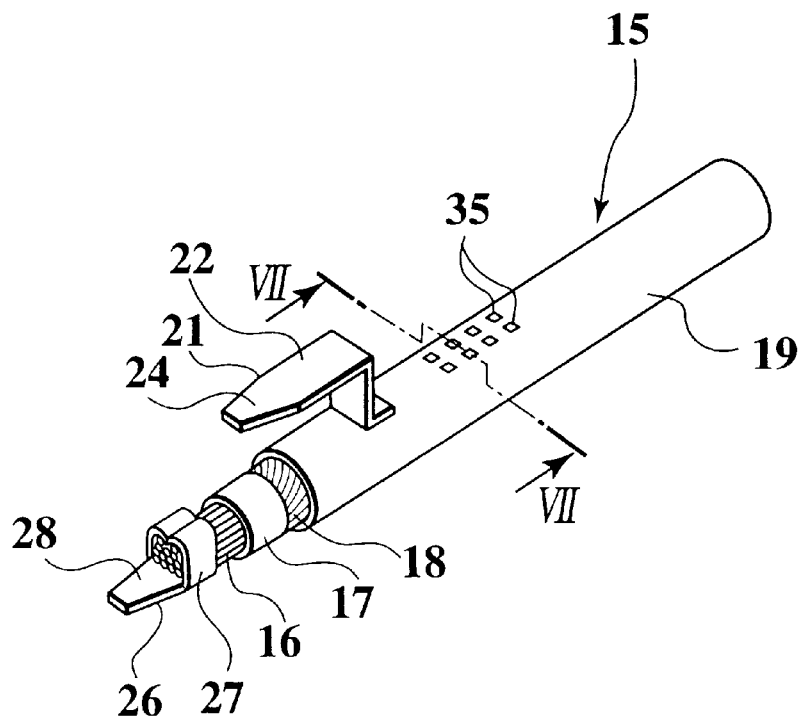
FIG. 5 is a perspective view showing a condition in which the shielded wire and a shielded terminal are connected according to the first embodiment.

In FIG. 5, reference numeral 35 denotes a pressurized mark of the small protrusion 32 formed on the outer insulating cover 19 by ultrasonic vibration. Because this pressurized mark corresponds to each of the small protrusions 32, its area is small and they are dispersed such that they are not easily noticeable, thereby not leading to a cause of deterioration of the appearance.

In addition to the above action, in this embodiment, the insertion connecting portion 23 is inserted in between the braided wire 18 of the shielded cable 15 and inner insulating cover 17, the insertion connecting portion 23 is inserted deeply into the inside in the diameter direction of the shielded cable. Thus, the shielded terminal 21 and shielded cable 15 can be firmly connected to each other and even if a pulling force is applied to the shielded terminal 21, the shielded terminal 21 never slips out, thereby ensuring a stabilized connection.

Further, because according to this embodiment, the slit 29 is provided at a position apart from the end portion of the shielded wire 15 and the insertion connecting portion 23 is inserted into this slit 29, there is assured a long portion in which the braided wire 18 and outer insulating cover 19 exist, from the slit 29 to the end portion of the shielded wire 15. Thus, even if a pulling force is applied to the shielded terminal 21, this portion receives that pulling force, so that the shielded terminal 21 is difficult to pull out.

Further, because the shielded terminal 21 has a simple structure containing the insertion connecting portion 23 and grounding terminal portion 24, production thereof is easy.

Further, because the insertion of the insertion connecting portion 23 into the shielded cable 15 can be carried out easily through the slit 29 formed on the outer insulating cover 19, the insertion is easy, so that that processing can be executed rapidly.

Although in the above embodiment, the insertion connecting portion 23 of the shielded terminal 21 is inserted in between the braided wire 18 and inner insulating cover 17, this insertion connecting portion 23 may be inserted in between the braided wire 18 and outer insulating cover 19. In this case, by coating the low-melting point joining material 20 on a bottom surface of the insertion connecting portion 23, the low-melting point joining material 20 can face the braided wire 18. In this case, the slit 29 only has to be as deep as it penetrates through the outer insulating cover 19. Thus, the formation of the slit 29 is facilitated and a resistance when the insertion connecting portion 23 is inserted is small, so that the insertion thereof is made easy.

Figure 8:
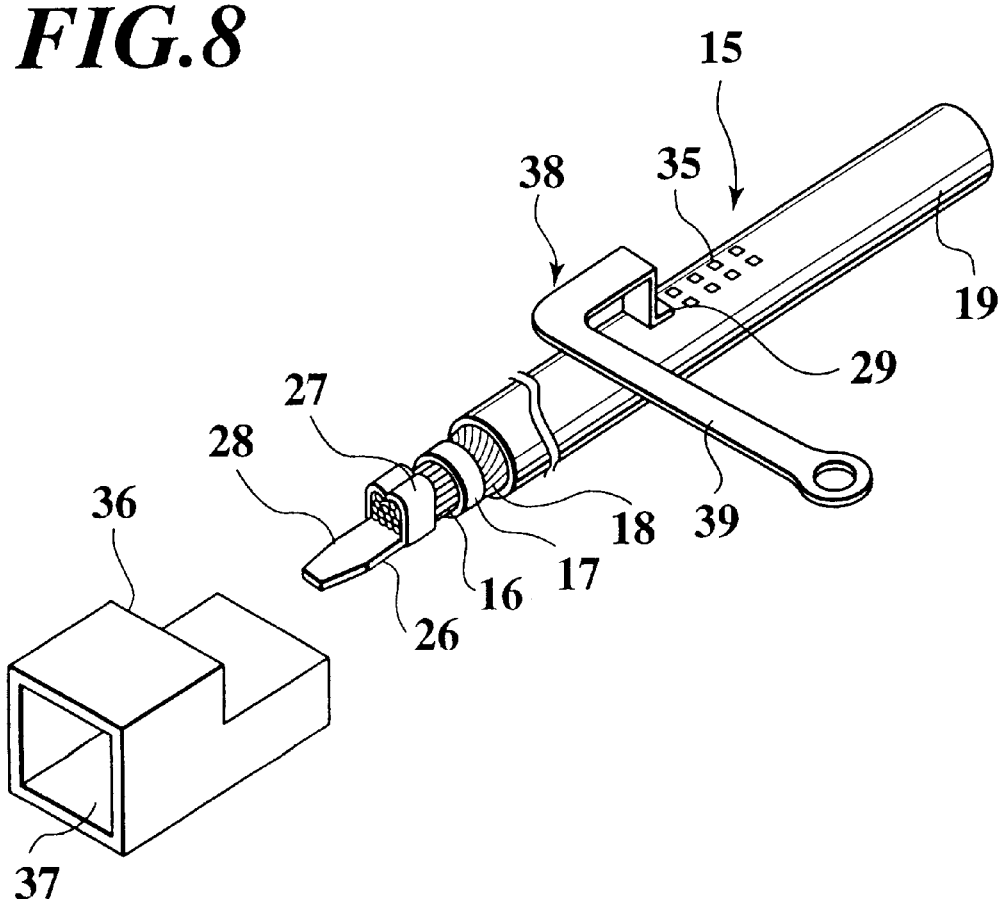
FIG. 8 is a perspective view showing a modification of the first embodiment.

FIG. 8 shows a modification of this embodiment. In the same Figure, reference numeral 36 denotes a connector housing, which has a terminal accommodating chamber 37. The terminal metal 26 attached to the core wires 16 is inserted into this terminal accommodating chamber 37.

Further, the shielded terminal 38 has the insertion connecting portion 23 (not shown) which is to be inserted into the shielded cable 15 in the same manner and connected to the braided wire by ultrasonic vibration. A grounding terminal portion 39 provided so as to be continuous from this insertion connecting portion is bent in a direction perpendicular to the length of the shielded cable 15. Thus, this is not accommodated in the connector housing 36, but grounded at any position outside of the connector housing 36.

Second Embodiment

Next, a second embodiment will be described with reference to FIGS. 9–13. The same reference numerals are attached to the same components as the first embodiment and a description thereof is omitted. Although, in the first embodiment, the connecting structure and method for connecting the shielded terminal 21 to an intermediate portion (portion except the end portion) of the shielded cable 15 has been described, the connecting structure and method for connecting the shielded terminal at the end portion of the shielded cable will be described.

Figure 9:
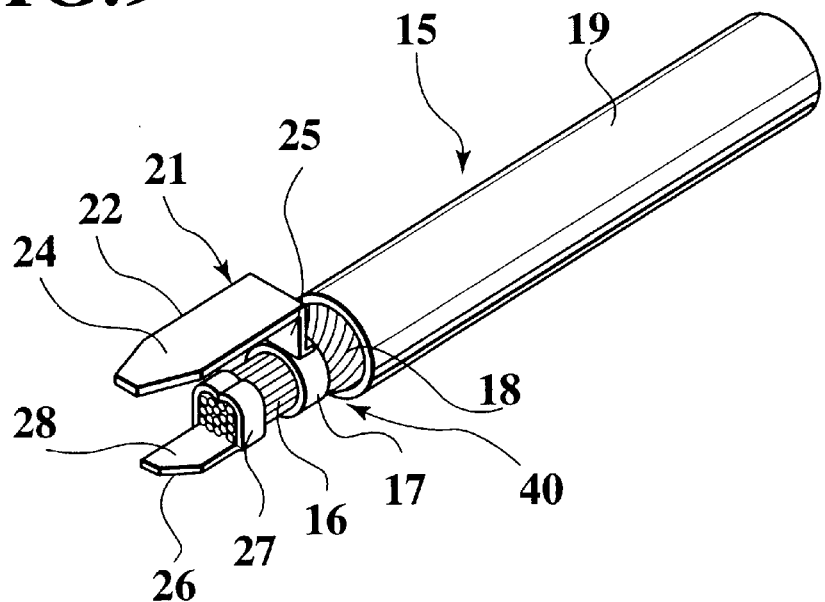
FIG. 9 is a perspective view showing a condition in which a shielded terminal is inserted into the shielded cable according to the second embodiment.
Figure 10:
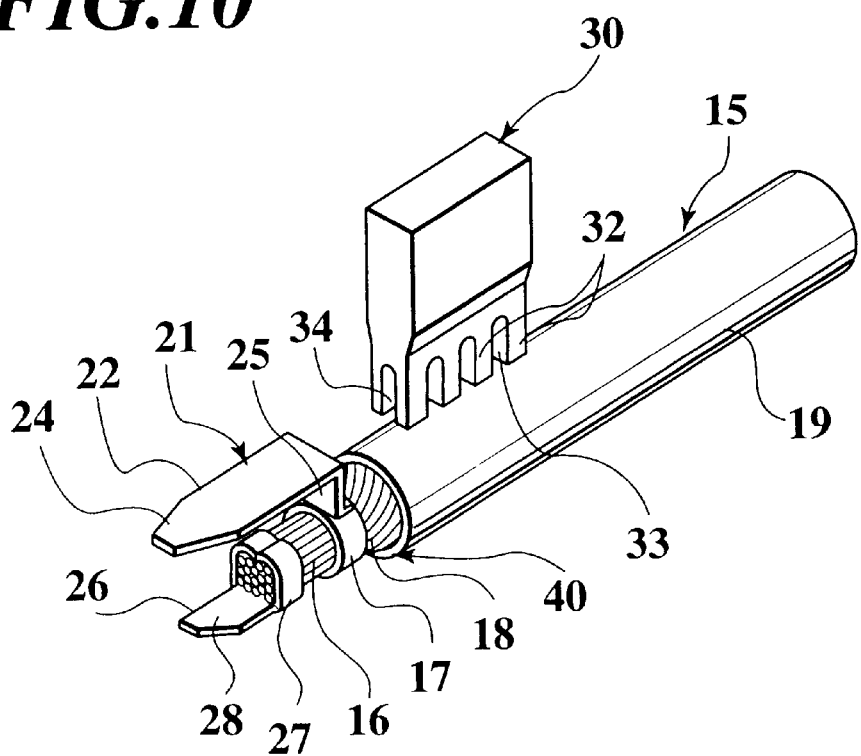
FIG. 10 is a perspective view showing a condition in which ultrasonic vibration is applied to the shielded cable and shielded terminal according to the second embodiment.
Figure 11:
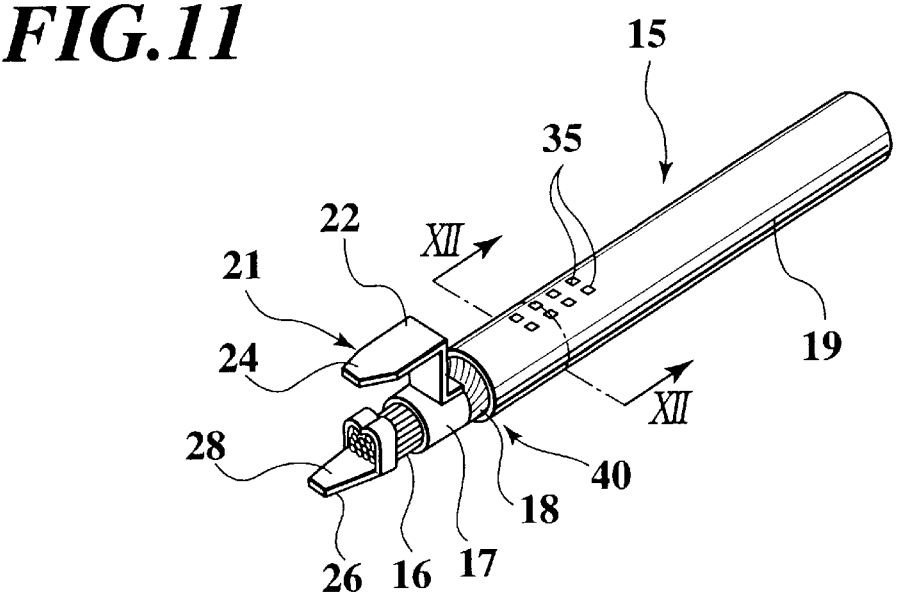
FIG. 11 is a perspective view showing a condition in which the shielded cable and shielded terminal are connected to each other by ultrasonic vibration according to the second embodiment.
Figure 12:
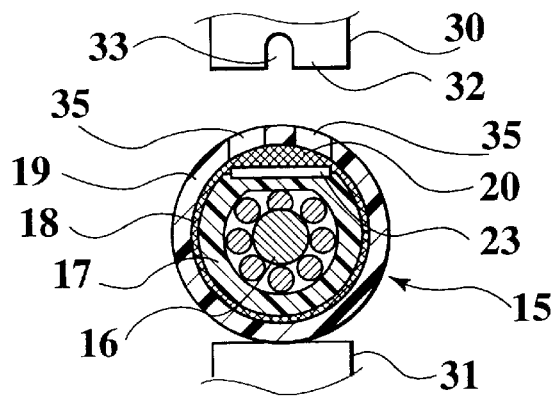
FIG. 12 is a sectional view taken along the line XII—XII showing a condition in which the shielded cable and shielded terminal are connected to each other according to the second embodiment.
Figure 13:
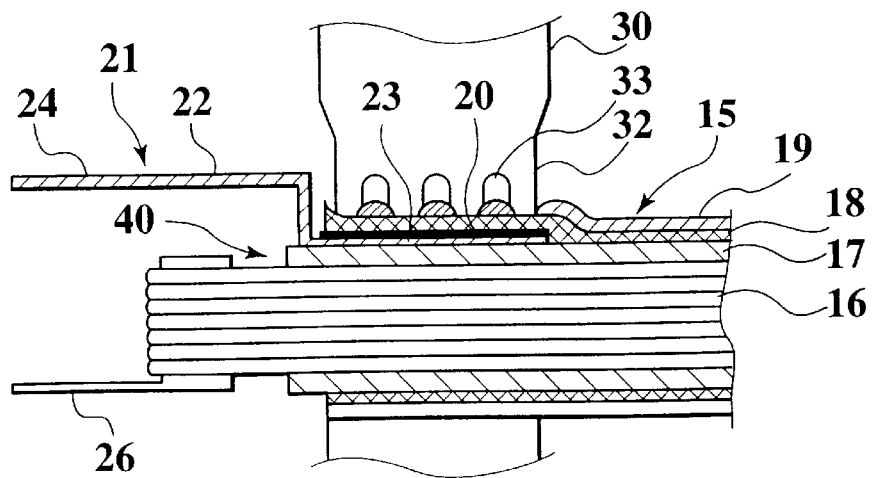
FIG. 13 is a sectional view showing a condition in which the shielded cable and shielded terminal are connected to each other according to the second embodiment.

According to the connecting structure for the shielded terminal of this embodiment, as shown in FIG. 9, the insertion connecting portion 23 of the shielded terminal 21 is inserted in between the inner insulating cover 17 and braided wire 18 from a face of an end portion 40 of the shielded cable 15. Then, ultrasonic vibration is applied onto the outer insulating cover 19 with the ultrasonic horn 30 like in the first embodiment, as shown in FIG. 10. If ultrasonic vibration is applied onto the outer insulating cover 19 with a pressure, pressurized marks are formed on the outer insulating cover 19 by the small protrusions 32 of the ultrasonic horn 30. Because, as shown in FIGS. 12, 13, heat is generated inside by ultrasonic energy of ultrasonic vibration, the low-melting point joining material 20 is melted and as a result, the braided wire 18 and insertion connecting portion 23 are metallically connected with each other by the melted low-melting point joining material. Because the melted low-melting point joining material invades into the meshes of the braided wire 18 at this time, the braided wire 18 and insertion connecting portion 23 are firmly connected with each other.

According to this embodiment, in addition to the same effect as the first embodiment, by inserting the insertion connecting portion 23 of the shielded terminal 21 in between the braided wire 18 and inner insulating cover 17 from the end portion 40 of the shielded cable 15 and applying ultrasonic vibration, the braided wire 18 and shielded terminal 21 are conductively connected with each other. As a result, the end portion of the shielded cable 15 can be treated easily.

As compared to the first embodiment, the necessity of providing the slit 29 in the outer insulating cover 19 is eliminated and instead, the insertion connecting portion 23 has only to be inserted in between the braided wire 18 and inner insulating cover 17. Therefore, the number of production steps is decreased thereby leading to reduction of production cost.

Third Embodiment

Next, a third embodiment will be described with reference to FIGS. 14–17. In this embodiment, a shielded terminal 41 having a different shape as the shielded terminal 21 of the respective embodiments is used.

Figure 14A:
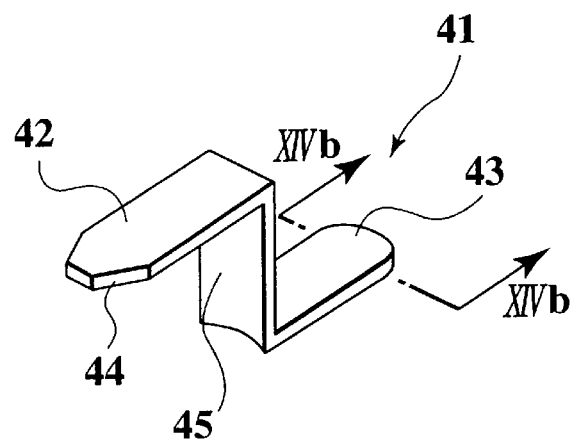
FIG. 14A is a perspective view showing a shielded terminal according to the third embodiment.
Figure 14B:
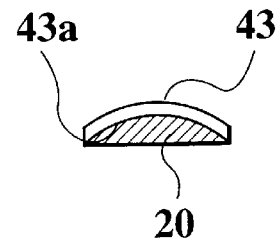
FIG. 14B is a sectional view taken along the line XIVb–XIVb of FIG. 14A.

As shown in FIG. 14A, the shielded terminal 41 is so shaped that a front end thereof is bent, and comprises a sheet-like terminal main body 42, an insertion connecting portion 43 provided on a side of the terminal main body 42 and a grounding terminal portion 44 provided on the other side of the terminal main body 42. The insertion connecting portion 43 is continuous to the grounding terminal portion 44 through a vertical bent portion 45. As shown in FIG. 14B, the insertion connecting portion 43 is so formed to have an arc-shaped section following an outer periphery of the shielded cable 15. The insertion connecting portion 43 is inserted in between the braided wire 18 and outer insulating cover 19 from the end portion 40 of the shielded cable 15, so that the low-melting point joining material 20 faces the braided wire 18.

Figure 15:
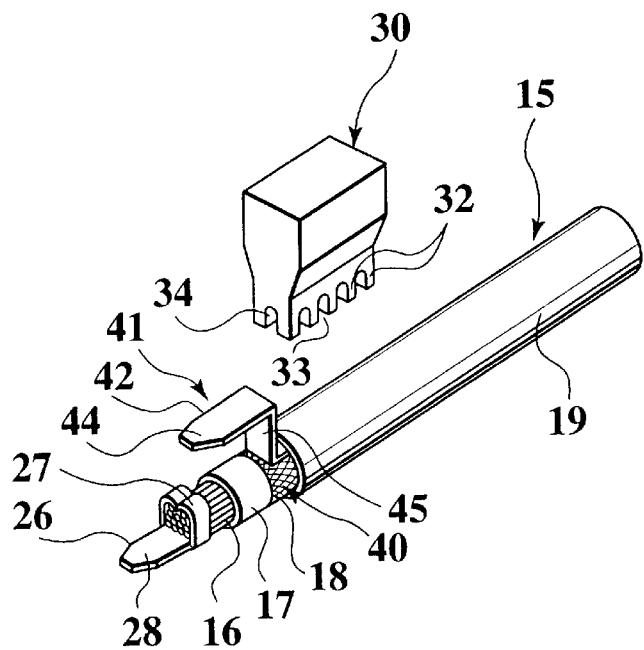
FIG. 15 is a perspective view showing a condition in which the shielded terminal of the third embodiment is inserted into the shielded cable and ultrasonic vibration is about to be applied.
Figure 16:
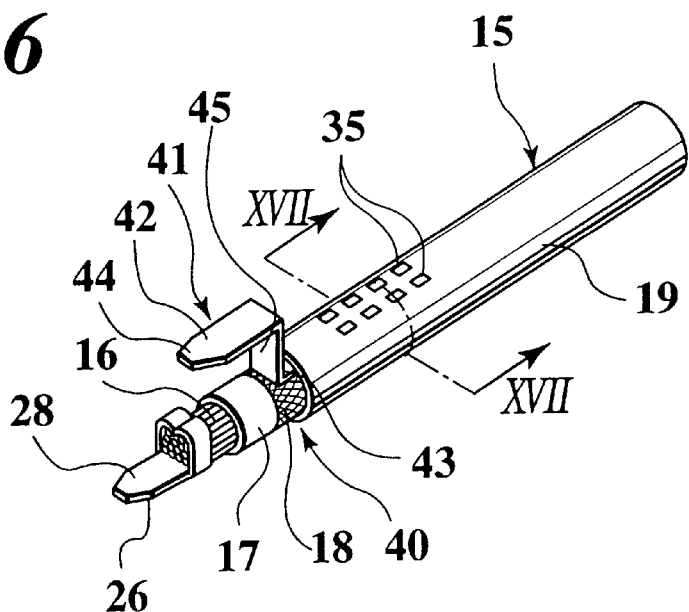
FIG. 16 is a perspective view showing a condition in which the shielded cable and shielded terminal according to the third embodiment are connected to each other by ultrasonic vibration.

To connect the shielded terminal 21 to the shielded cable 15, as shown in FIGS. 15, 16, the insertion connecting portion 23 is inserted in between the outer insulating cover 19 and braided wire 18 from the end portion 40 of the shielded cable 15, then this portion is nipped between the ultrasonic horn 30 and anvil 31, and ultrasonic vibration is applied with a pressure. By a heat generated inside by ultrasonic energy of ultrasonic vibration, the low-melting point joining material 20 is melted and the braided wire and insertion connecting portion 43 are metallically connected with each other by the melted low-melting point joining material 20. Because the melted low-melting point joining material 20 invades into the meshes of the braided wire 18 at this time, the braided wire 18 and insertion connecting portion 43 are firmly connected with each other.

Figure 17:
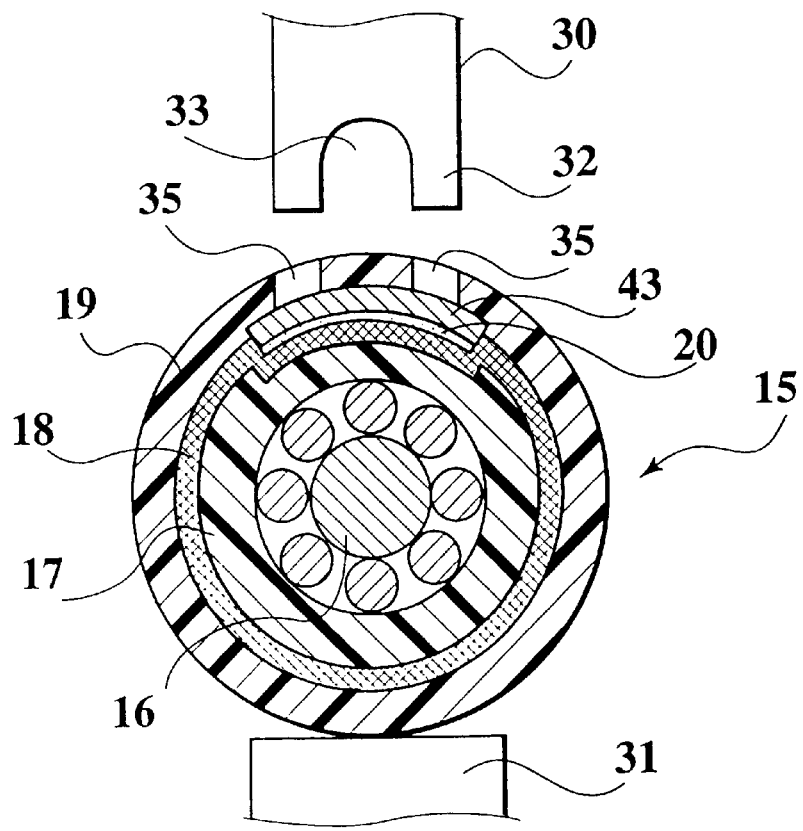
FIG. 17 is a sectional view taken along the line XVII—XVII of FIG. 16 showing a condition in which the shielded cable and shielded terminal according to the third embodiment are connected to each other by ultrasonic vibration.

Further, because according to this embodiment, the insertion connecting portion 43 is formed in the shape of an arc following the outer periphery of the shielded cable, there never occurs a phenomenon in which the low-melting point joining material 20 is melted and flows out from both sides in the width direction of the insertion connecting portion 43 when ultrasonic vibration is applied as shown in FIG. 17. As a result, the low-melting point joining material 20 can be concentrated between the insertion connecting portion 43 and braided wire 18. Consequently, the insertion connecting portion 43 and braided wire 18 can be firmly connected with each other and further because no low-melting point joining material 20 flows out to any other part, the connection can be carried out effectively.

Fourth Embodiment

A fourth embodiment of the present invention will be described with reference to FIGS. 18–24. According to this embodiment, instead of the shielded terminals 21, 41 used in the above respective embodiments, a grounding cable 51 is used and this grounding cable 51 is connected to the braided wire 18 of the shielded cable 15.

The grounding cable 51 comprises a cable main body 54 (see FIG. 18) in which a core wire 52 made of conductor is covered with an insulating cover 53, a grounding terminal 55 (see FIG. 18) connected to an end portion of this cable main body 54 and a sheet-like shield connecting piece 56 (see FIG. 19) provided at an proximal end of the cable main body 54. As the cable main body 54, general type cables are available.

The grounding terminal 55 includes a crimping portion 55a which is crimped to the core wires 52 at an end portion of the cable main body 54 so as to establish conductivity with the core wires 52 and a connecting portion 55b which is to be connected with a grounding object (not shown) and provided continuously with the crimping portion 55a. As the grounding terminal 55, general type terminal metals are available.

The shield connecting piece 56 is provided at the proximal end of the cable main body 54 and the low-melting point joining material 20 is coated on a surface thereof. The shield connecting piece 56 is inserted into the shielded cable 15 in such a condition that the low-melting point joining material 20 faces the braided wire 18 of the shielded cable 15. Then, by applying ultrasonic vibration onto the outer insulating cover 19 of the shielded cable 15, the shield connecting piece 56 is connected to the braided wire 18.

Figure 18:
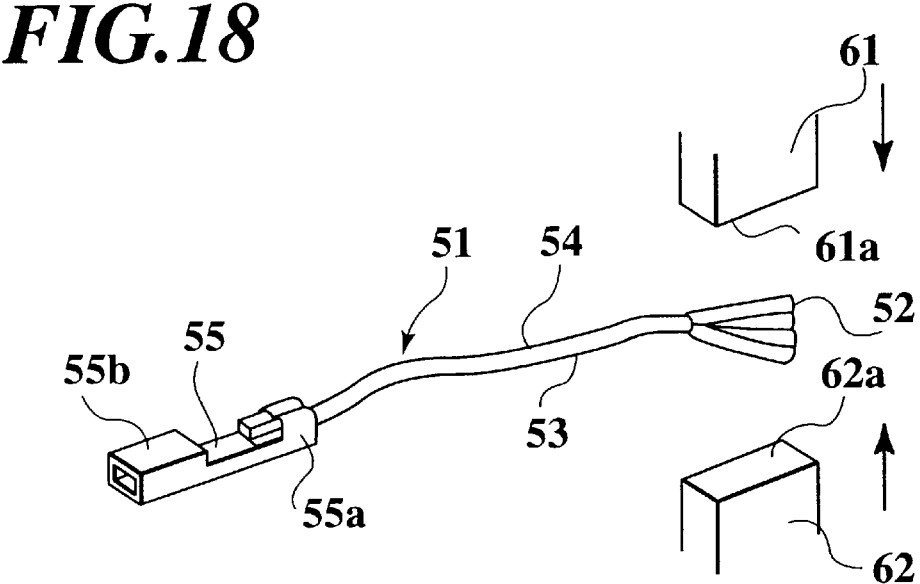
FIG. 18 is a perspective view showing a step for producing a grounding cable according to a fourth embodiment.
Figure 19:
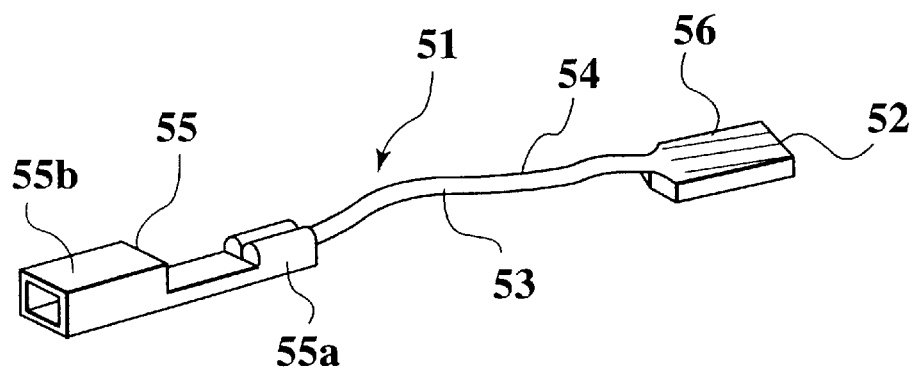
FIG. 19 is a perspective view of a grounding cable according to the fourth embodiment.

FIG. 18 shows a method for producing the grounding cable 51 of FIG. 19. The grounding terminal 55 is connected to an end of the cable main body 54 and the insulating cover 53 at the proximal end of the cable main body 54 is peeled so as to expose the core wires 52. The core 52 of the proximal end is nipped by a pair of thermo compression bonding jigs 61, 62 and the thermo compression bonding is carried out with a pressure. The thermo compression bonding jigs 61, 62 have nipping faces 61a, 62a each having a flat surface for nipping the core wires 52 in a condition that they are in contact with the core wires 52. By compression-bonding the core wires 52 each composed of a fine wire by heat, the core wires 52 are bonded together to produce a tab. As a result, as shown in FIG. 19, the sheet-like shield connecting piece 56 is produced. Then, by coating the low-melting point joining material on a surface of the shield connecting piece 56, it is connected to the shielded cable 15.

If a pair of the thermo compression bonding jigs 61, 62 have a function for compression-bonding the core wires 52 thermally, various types of the jigs are available. For example, in case of compression-bonding the core wires 52 thermally by ultrasonic fusion method, an ultrasonic horn is used as one jig 61 and an anvil is used as the other jig 62. In case of compression-bonding the core wires 52 by resistance welding, a pair of electrodes for welding can be used as a pair of the jigs 61, 62.

For the grounding cable 51 shown in FIGS. 18, 19, general type covered wires are available as the cable main body 54 and by compression-bonding the core wires of the cable main body 54 thermally, the shield connecting piece 56 can be produced. Thus, the grounding cable can be obtained by carrying out such a simple processing on general type covered cable, so that that production can be made at low cost.

Figure 20:
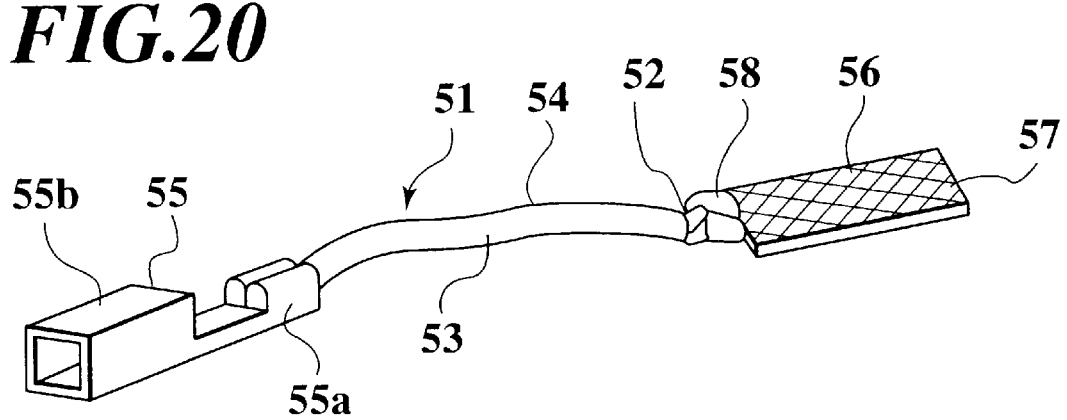
FIG. 20 is a perspective view of another grounding cable according to the fourth embodiment.

FIG. 20 shows an example of the grounding cable 51. In the grounding cable 51, a sheet-like conductive member 57 is used as the shield connecting piece 56 at the proximal end of the cable main body 54. The sheet-like conductive member 57 is composed of a rectangular plate extending in the length direction of the cable main body 54, and by crimping a crimping portion 58 at an end thereof to the core wires 52 at the proximal end of the cable main body 54, the conductive member 57 is conductively connected to the core wires 52. After this conductive treatment is made, the low-melting point joining material 20 is coated on a surface of the conductive member 57 so as to connect the conductive member 57 to the shielded cable 15. In case of the grounding cable 51 having such a structure as well, it is connected to the core wires 52 of the cable main body 54 by only crimping the conductive member 57. Therefore, that production is easy. Instead of crimping, it is permissible to connect the conductive member 57 to the core wires 52 by soldering.

Figure 21:
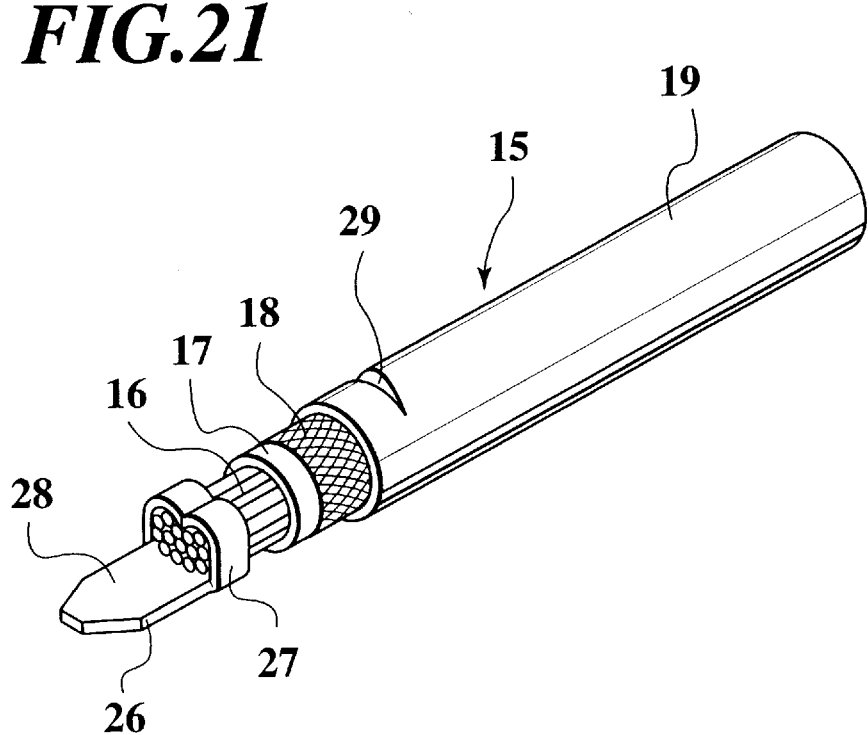
FIG. 21 is a perspective view of a shielded cable to which the grounding cable is to be connected, according to the fourth embodiment.
Figure 22:
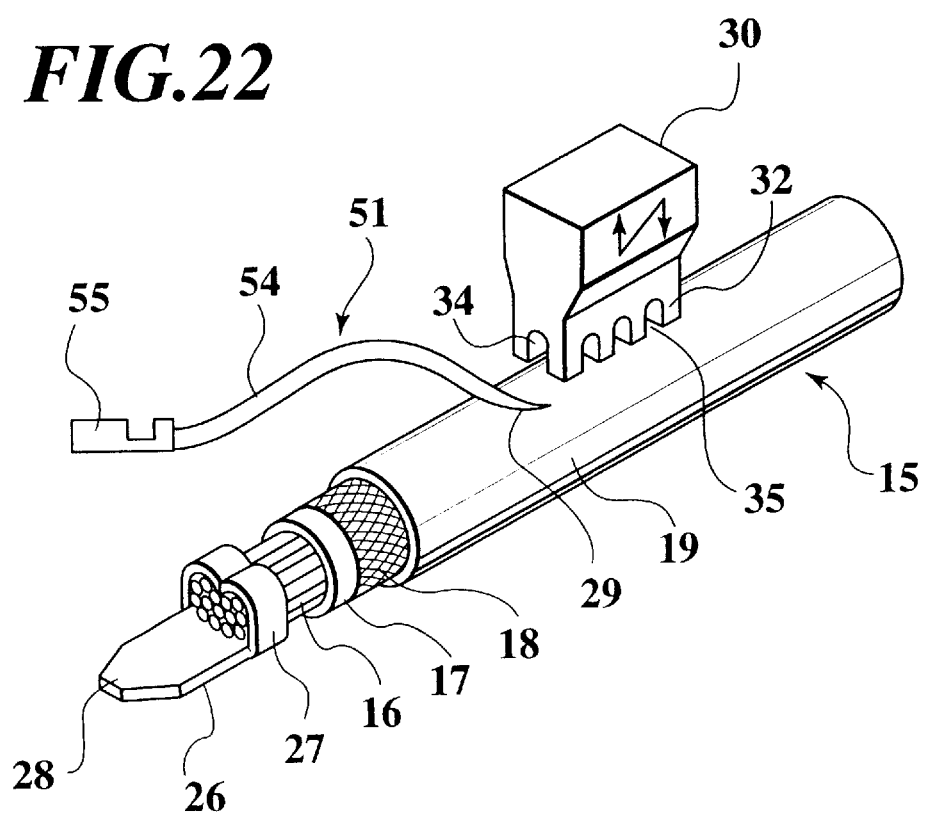
FIG. 22 is a perspective view showing a condition in which ultrasonic vibration is applied to connect the grounding cable to the shielded cable according to the fourth embodiment.

FIGS. 21–24 show steps for connecting the grounding wire produced in the above manner to the shielded cable 15. FIGS. 21, 22 show a case in which the grounding cable 51 is connected to the shielded cable 15 according to the first embodiment. As shown in FIG. 21, the slit 29 is formed on the outer insulating cover 19 of the shielded cable 15 and then the shield connecting piece of the grounding cable 51 is inserted in between the outer shielding cover 19 and braided wire 18 through the slit 29, such that the low-melting point joining material 20 faces the braided wire 18. Because the shield connecting piece 56 is a sheet, it can be inserted into the shielded cable easily and securely.

Figure 23:
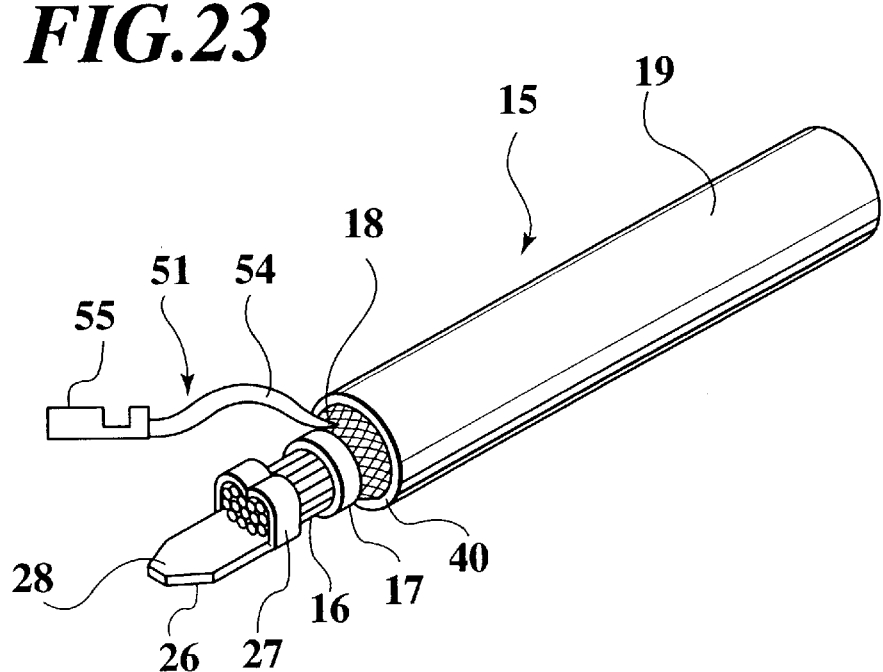
FIG. 23 is a perspective view showing a condition in which the grounding cable of the fourth embodiment is inserted into the shielded cable.
Figure 24:
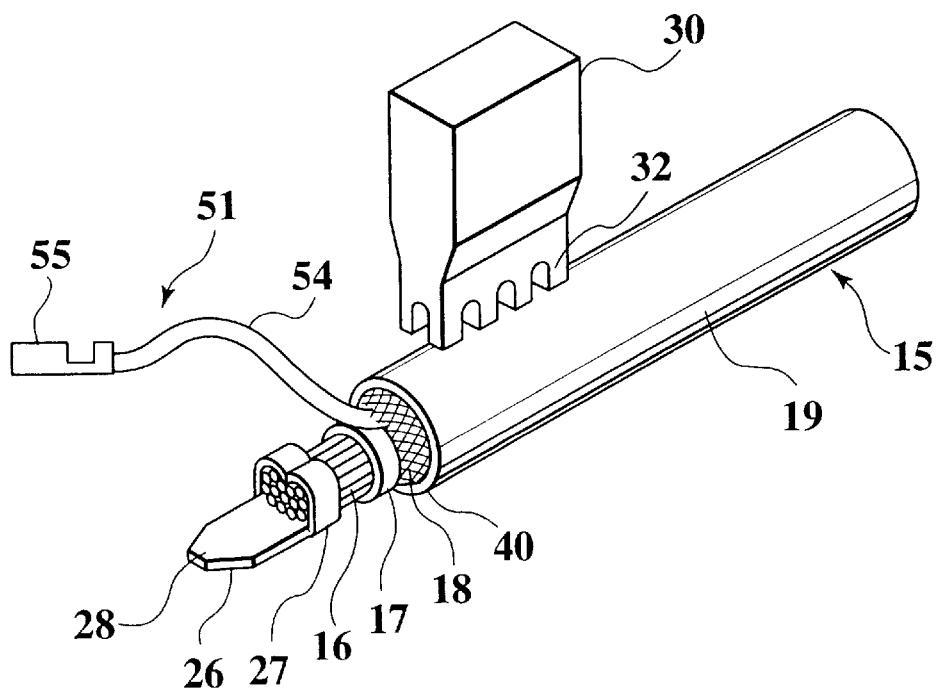
FIG. 24 is a perspective view showing a condition in which ultrasonic vibration is applied after the condition of FIG. 23.

FIGS. 23, 24 show a case in which the grounding cable 51 is connected to the shielded cable 15 according to the second embodiment. As shown in FIG. 23, the shield connecting piece 56 of the grounding cable 51 is inserted in between the inner insulating cover 17 and braided wire 18 through a face of the end portion 40 of the shielded cable 15, such that the low-melting point joining material 20 contacts the braided wire 18. In this case also, because the shield connecting piece 56 is a sheet, it can be inserted into the shielded cable 15 easily and securely.

After the shield connecting piece 56 is inserted, as shown in FIGS. 22, 24, ultrasonic vibration is applied to the outer insulating cover 19 by the ultrasonic horn 30. If ultrasonic vibration is applied to the outer insulating cover 19 with a pressure, heat is generated inside by ultrasonic energy by ultrasonic vibration, so that the low-melting point joining material is melted, thereby the melted low-melting point joining material 20 metallically connecting the braided wire 18 and shield connecting piece 56 with each other. Because the melted low-melting point joining material 20 invades into the meshes of the braided wire 18 so that the braided wire 18 and shield connecting piece 56 are firmly connected with each other.

According to this embodiment, instead of the rigid shielded terminals 21, 41 like the first-third embodiments, the grounding cable 51 having the flexible cable main body 54 is connected to the shielded cable 15, it can be curved or bent freely so that it can be arranged at any position corresponding to a grounding object. Therefore, the freedom of wiring can be intensified.

What is claimed is:

1. A connecting structure for connecting a shielded cable and a terminal, comprising:

a shielded cable having conductive core wire, an inner insulating portion for covering the core wire, a braided wire on an outer periphery of the inner insulating portion, and an outer insulating portion over the braided wire for covering the outer periphery of the inner insulating portion; and a terminal containing a connecting portion coated with melt-joining material, the melt-joining material facing the braided wire with the connecting portion being inserted in the shielded cable, and the shielded cable subjected to ultrasonic vibration through small protrusions of an ultrasonic horn on the outer insulating portion, whereby the melt-joining material is melted so as to conductively connect the braided wire and the connecting portion with each other.

2. A connecting structure according to claim 1, wherein the connecting portion of the terminal is inserted between the braided wire and the inner insulating portion.

3. A connecting structure according to claim 1, wherein the terminal includes a sheet-like terminal main body, the connecting portion on one side of the terminal main body, and a grounding terminal portion on the other side of the terminal main body, and the melt-joining material is coated on a surface of the connecting portion.

4. A connecting structure according to claim 1, wherein the outer insulating portion has a slit and the connecting portion is inserted into the shielded cable through the slit.

5. A connecting structure according to claim 1, wherein the melt-joining material is solder.

6. A connecting method for connecting a shielded cable and a terminal; the shielded cable comprising conductive core wire, an inner insulating portion for covering the core wire, a braided wire on an outer periphery of the inner insulating portion, and an outer insulating portion located over the braided wire for covering the outer periphery of the inner insulating portion, and the terminal containing a connecting portion coated with melt-joining material, the method comprising the steps of:

inserting the connecting portion into the shielded cable, the melt-joining material facing the braided wire; and applying ultrasonic vibration to the shielded cable through small protrusions of an ultrasonic horn in contact with the outer insulating portion, the melt-joining material melted so as to conductively connect the braided wire and the connecting portion with each other.

7. A connecting method according to claim 6, wherein a slit is formed on the outer insulating portion and the connecting portion is inserted into the shielded cable through the slit.

8. A connecting method according to claim 7, wherein the slit reaches the inner insulating portion through the outer insulating portion and the braided wire.

9. A connecting method according to claim 7, wherein the connecting portion of the terminal is inserted between the braided wire and the inner insulating portion.

10. An ultrasonic horn for use in connecting a shielded cable and a terminal; the shielded cable comprising conductive core wire, an inner insulating portion for covering the core wire, a braided wire on an outer periphery of the inner insulating portion, and an outer insulating portion over the braided wire for covering the outer periphery of the inner insulating portion; the terminal containing a connecting portion coated with melt-joining material; the melt-joining material facing the braided wire with the connecting portion being inserted in the shielded cable; the ultrasonic horn comprising:

an end portion coming into contact with the outer insulating portion; and a plurality of small protrusions formed on the end portion, the shielded cable subjected to ultrasonic vibration through the small protrusions of the ultrasonic horn on the outer insulating portion, whereby the melt-joining material is melted so as to conductively connect the braided wire and the connecting portion with each other.

11. An ultrasonic horn according to claim 10, wherein the small protrusions are spaced together along the length of the shielded cable.

12. A connecting structure for connecting a shielded cable and a grounding cable, comprising:

a shielded cable having conductive core wire, an inner insulating portion for covering the core wire, a braided wire on an outer periphery of the inner insulating portion, and an outer insulating portion over the braided wire for covering the outer periphery of the inner insulating portion; and a grounding cable having a cable main body, a grounding terminal connected to one end of the cable main body, and a sheet-like connecting piece connected to the other end of the cable main body, the connecting piece being coated with melt-joining material; the melt-joining material facing the braided wire with the connecting piece being inserted in the shielded cable; and the shielded cable subjected to ultrasonic vibration through small protrusions of an ultrasonic horn on the outer insulating portion, whereby the melt-joining material is melted so as to conductively connect the braided wire and the connecting piece with each other.

13. A connecting structure according to claim 12, wherein the cable main body has a plurality of conductive core wires, and the connecting piece is constituted of core wires of the cable main body formed in a tab shape by thermo compression bonding.

14. A connecting structure according to claim 12, wherein the connecting piece is constituted of a sheet-like conductive member conductively connected to the cable main body.

15. A connecting structure according to claim 12, wherein the outer insulating portion has a slit and the connecting portion is inserted into the shielded cable through the slit.

16. A connecting method for connecting a shielded cable and a grounding cable; the shielded cable having conductive core wire, an inner insulating portion for covering the core wire, a braided wire on an outer periphery of the inner insulating portion, and an outer insulating portion over the braided wire for covering the outer periphery of the inner insulating portion; the method comprising the steps of:

connecting a grounding terminal to one end of a cable main body of the grounding cable;

providing a connecting piece on the other end of the cable main body;

coating the connecting piece with melt-joining material;

inserting the connecting piece into the shielded cable, the melt-joining material facing the braided wire; and applying ultrasonic vibration to the shielded cable through a plurality of small protrusions of an ultrasonic horn in contact with the outer insulating portion, the melt-joining material melted so as to conductively connect the braided wire and the connecting piece with each other.

17. A connecting method according to claim 16, wherein the cable main body has a plurality of conductive core wires, and the connecting piece is constituted of core wire of the cable main body formed in a tab shape by thermo compression bonding.

18. A connecting method according to claim 16, wherein the connecting piece is constituted of a sheet-like conductive member conductively connected to the cable main body.

* * * * *